UNITED STATES PATENT OFFICE.

SOLOMON W. KIRK, OF PHILADELPHIA, PENNSYLVANIA.

IMPROVEMENT IN SEPARATING PRECIOUS METALS FROM ORES.

Specification forming part of Letters Patent No. 144,772, dated November 18, 1873; application filed April 23, 1873.

*To all whom it may concern:*

Be it known that I, SOLOMON W. KIRK, of Philadelphia, county of Philadelphia and State of Pennsylvania, have invented a certain Improved Process for Separating Precious Metals from their Ores, of which the following is a specification:

My invention relates to a process of separating gold and silver from the pyrites of iron and copper, as well as from what are called "mill-ores" in the mining districts. Many of these ores contain the precious metals in such minute particles, and which are so thoroughly intermixed with the minerals in the mass, that their weight is not sufficient to enable them to segregate themselves therefrom, even when thoroughly pulverized and subjected to a high degree of heat; hence such ores have been regarded as valueless, and have been abandoned accordingly. Now, the object of my invention is to separate the precious metals from them with such ease and economy as to render them valuable, and in order to do this the ores are thoroughly pulverized and roasted.

The roasting may either precede or follow the pulverization. Then the pulverized and roasted mass should be placed in a digester, or any suitable vessel of sufficient strength and perfectly air-tight, together with a sufficient quantity of mercury, for the purpose hereinafter explained, and then the vessel should be exhausted of air, and heat should be applied thereto, so as to thoroughly vaporize the mercury as well as the sulphur, or any other volatile matter remaining after the process of roasting. The containing-vessel should, by means of a pipe, be connected with another vessel, kept cool in any suitable manner, as a condenser.

Upon the sufficient application of heat to the containing-vessel, the mercury will vaporize and a portion of it unite with the sulphur present, and form with it artificial cinnabar, while another portion will form an amalgam with the metal thus set free from the sulphur. This is the first stage of the process. Then, upon the application of a still higher degree of heat, the amalgam will be reduced, and the metal set free, while the mercury disengaged will pass over into the condenser, leaving the metal behind, and the artificial cinnabar will also be reduced, and the sulphur and mercury pass over into the condenser and be there separately condensed. This is the second stage of the process.

The process being carried on *in vacuo*, as before specified, a lower temperature is required than would otherwise be, and the liability to leakage, breakage, and explosion is much diminished, if not entirely avoided, and much better direct results are obtained than could be without exhausting the containing-vessel of atmospheric air.

This I have found to be true by actual experiment, for I have subjected pulverized and roasted rock containing silver to the process above described, leaving out the operation of exhausting the containing-vessel of air, and have entirely failed to extract any of that metal; and then again I have used the same vessel and appliances, the same degree of heat, exactly similar ores, the same proportion of them, and of mercury, with the addition of exhausting the vessel of air, as before stated, with entire success in separating the silver.

I am aware that Robert Spencer, in his Letters Patent of the United States for an improved method of extracting gold and silver from ores by means of the vapor of mercury, dated November 22, 1864, and numbered 45,188, claims the use of mercury to effect the same general object which I do by this my process; but it is made an essential ingredient in his process that the matrix and mercury shall be subjected to heat in a closed vessel under pressure. But this differs from my process in this, that the success of my invention requires the subjecting the matrix and mercury together in the same vessel to heat *in vacuo*. I therefore disclaim so much of the above-described process as is described and claimed by said Spencer in his said patent.

What I claim as my invention is—

1. The process herein described for separating the precious metals from the matrix, by subjecting the mixed pulverized ore and mercury to heat *in vacuo*, substantially in the manner and for the purpose described.

2. The mode herein described of separating the precious metals and recovering the mercury, viz., subjecting the ore previously pulverized and roasted, mixed with a sufficient quantity of mercury, to heat *in vacuo*, and condensing and retaining the vapors given off, substantially as and for the purpose specified.

SOLOMON W. KIRK.

Witnesses:
    E. N. WATERS,
    ALEX. M. STOUT, Jr.